June 27, 1944.  R. A. W. SPOONER  2,352,414
CONNECTING DEVICE
Filed Dec. 17, 1942
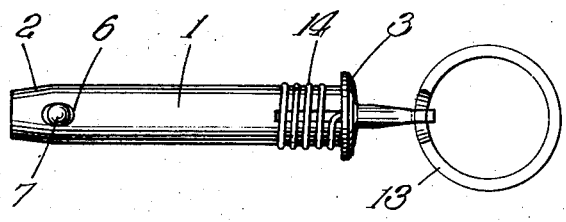
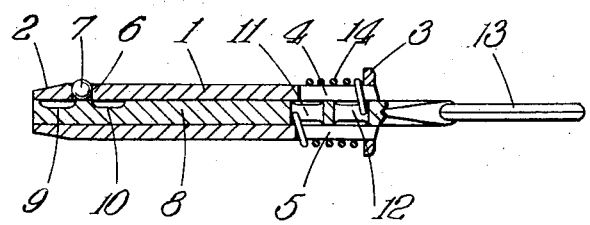
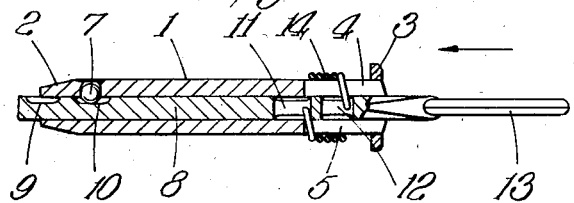
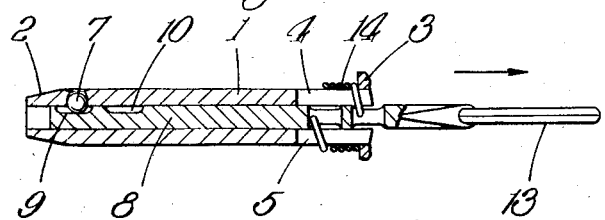
Inventor:
Reginald A.W. Spooner
BY
Richards y Geier
ATTORNEYS

Patented June 27, 1944

2,352,414

UNITED STATES PATENT OFFICE

2,352,414
CONNECTING DEVICE

Reginald Arthur William Spooner, Walton-on-Thames, England, assignor to Woodfield Engineering Limited, London, England, an English joint-stock company Application December 17, 1942, Serial No. 469,344
In Great Britain December 20, 1941

5 Claims. (Cl. 85—5)

This invention relates to improvements in connecting devices intended for connecting sheets or other articles having registering apertures.

A device of this character is known comprising a tubular member having a head portion, an axially movable spring-urged member therein, one or more radially movable members normally extending above the surface of the tubular member in which position they are held by the axially movable member, and means for moving said axially movable member against the action of its spring to permit movement of the inward radially movable member or members, the arrangement being such that when the axially movable member is manually displaced the tubular member may be introduced through apertures in the articles to be connected together, whereafter on releasing the axially movable member it is restored by its spring to normal position when the radially movable member or members project beyond the surface of the tubular member and prevent withdrawal of the device.

The object of the present invention is to provide an improved device capable of being operated optionally either by a pushing or by a pulling force.

To this end according to the present invention the connecting device comprises a tubular member, an axially movable member therein, one or more radially displaceable members extending through the wall of the tubular member, spring means effective on the axially movable member tending to restore it to normal position against displacement in either direction, and recesses or portions of reduced diameter in said axially displaceable member such that, on displacement of said member, in either direction, the radially movable member or members may be retracted below the outer surface of the tubular member to permit the same to enter or be extracted from an aperture or registering apertures.

The radially displaceable members preferably take the form of balls which are arranged near the one end of the tubular member and at that extremity, that member preferably is tapered to facilitate entry of the device into an aperture or registering apertures. At the opposite end, or at some point intermediate the opposite end and the ball or balls, is provided an annular external flange or protuberance. Displacement of the device from location in an aperture or in registering apertures is prevented in the one direction by the flange or protuberance and in the opposite direction by the ball or balls until such time as the axially displaceable member is displaced either in the one direction by a push or in the opposite direction by a pull, for which purpose the axially displaceable member extends beyond the end of the tubular member remote from the ball or balls and is there provided with means permitting convenient finger operation, for example, a ring. In this way, the device may simply and easily be introduced into an aperture or registering apertures by pushing on the axially displaceable member, and removed from such aperture or registering apertures by pulling on the finger ring.

The spring means effective on the axially placeable member conveniently comprises a coil spring, the opposite ends of which engage in a slot or suitable apertures provided in the axially displaceable member, and means are provided for preventing expansion of the spring. The spring is, therefore, contracted and tensioned on displacement of the axially displaceable member in either the one or the other direction to tend to restore it to normal position. Thus, for example, the spring may be coiled around the outer periphery of the tubular member and its ends extend through a slot or slots therein to engage the axially displaceable member. The limits of the slot or slots prevent expansion of the spring whilst permitting free contraction thereof. Where the flange referred to above is at the end of the tubular member the slot or slots may extend in from the ends of the tubular member and be closed off by said flange which may be formed as a separate element secured in a convenient manner to the tubular member. Equally well, the spring could be arranged in a portion of larger diameter in the bore of the tubular member.

In order that the invention may be clearly understood and readily carried into effect an embodiment thereof is by way of example more fully described hereinafter with reference to the accompanying drawing which is given for purposes of illustration only and not of limitation.

In the drawing—

Fig. 1 is an exterior view of the connecting device;

Fig. 2 is a longitudinal section through the device with the parts in normal position;

Fig. 3 is similar to Fig. 2 showing the parts in the position they occupy when the axially movable member is displaced by a push; and Fig. 4 is similar to Fig. 2 showing the parts in the position they occupy when the axially movable member is displaced by a pull.

Referring now to the said drawing, the device comprises a tubular barrel 1 which has a tapered portion 2 at one end and at the other end a peripheral flange 3 which may be integral or separately formed. At the flanged end of the tubular barrel 1 are provided opposed slots 4 and 5 whilst near the tapered end thereof there are provided one or more radial apertures 6 in each of which is located a ball 7 in such manner that it cannot escape outwardly from the aperture 6.

Within the bore in the barrel 1 is an axially movable member 8. Near the one end of this member 8 are two recesses 9, 10 or portions of reduced diameter whilst towards the other end thereof are two further recesses 11, 12. This end of the member may be apertured to receive a split ring 13 or the like.

A coil spring 14 is arranged exteriorly of the barrel with its one end extending through the slot 4 to enter the recess 12 and with its other end extending through the slot 5 to enter the recess 11. With the parts in normal position as shown in Fig. 2 the ends of the spring 14 exert equal pressure on the opposite ends of the recesses 11 and 12 and thus tend to hold the member 8 in position with the portion thereof between the recesses 9, 10 holding the ball 7 projecting partly above the surface of the barrel.

When as shown in Fig. 3 the member 8 is displaced by a push in the direction of the arrow, the end of the recess 12 causes compression of the spring 14, during which the other end of the spring rides in its recess 11. The recess 10 is now located below the ball 7 which falls and now no longer projects above the surface of the barrel. The device therefore may now be introduced into an aperture or registering apertures. On ceasing to push the member 8, the spring 14 expands and restores the parts to normal position as in Fig. 2.

When as shown in Fig. 4 the member 8 is displaced by a pull, in the direction of the arrow, as by hooking a finger in the ring 13 the end of the recess 11 causes compression of the spring 14 during which the other end of the spring rides idly in the recess 12. The recess 9 is now located below the ball 7 which as before falls and the device may now be extracted from the aperture or registering apertures. As soon as the pull effort ceases, the spring 14 expands and again restores the parts to normal position.

It will be appreciated that both ends of the spring 14 may extend through the same slot when only one slot need be provided, that there may be more than one ball 7, that there may be a further flange situated at or near the other end of the spring, and that other detail alterations may be made in the construction without departing from the invention.

What I claim is:

1. A connecting device comprising a tubular member, an axially movable member therein, at least one radially movable member in a passage in the wall of said tubular member from which said radially movable member cannot escape outwardly but through which a portion of said radially movable member projects beyond the external surface of said tubular member when said axially movable member is in its normal position, means permitting said radially movable member to move inwards to a position at least flush with the external surface of the tubular member on displacement of the axially movable member in either direction and spring means effective on said axially movable member and tending to restore it to normal position.

2. A connecting device comprising a tubular member, an axially movable member therein, at least one radially movable ball in a passage in the wall of said tubular member from which said ball cannot escape outwardly but through which a portion of said radially movable ball projects beyond the external surface of said tubular member when said axially movable member is in its normal position, means permitting said ball to move inwards to a position at least flush with the external surface of the tubular member on displacement of the axially movable member in either direction and spring means effective on said axially movable member and tending to restore it to normal position.

3. A connecting device comprising a tubular member, an axially movable member therein, at least one radially movable ball in a passage in the wall of said tubular member from which said ball cannot escape outwardly but through which a portion of said radially movable ball projects beyond the external surface of said tubular member when said axially movable member is in its normal position, two recesses near one end of said axially movable member into either one of which the ball may sink on displacement of said member, and spring means effective on said axially movable member and tending to restore it to normal position.

4. A connecting device comprising a tubular member, an axially movable member therein, at least one radially movable ball in a passage in the wall of said tubular member from which said ball cannot escape outwardly but through which a portion of said radially movable ball projects beyond the external surface of said tubular member when said axially movable member is in its normal position, two reduced portions near one end of said axially movable member to permit the ball to sing on displacement of said member, and a coil spring on said tubular member with its ends extending through at least one slot in said member to engage recesses in said axially movable member and tend to restore it to normal position.

5. A connecting device, comprising a tubular member, an axially movable member therein, at least one radially movable member in a passage formed in the wall of said tubular member from which said radially movable member cannot escape outwardly but through which a portion of said radially movable member projects beyond the external surface of said tubular member when said axially movable member is in its normal position, means permitting said radially movable member to move inwards to a position at least flush with the external surface of the tubular member on displacement of the axially movable member in either direction, and resilient means engaging said axially movable member and holding it in its normal position.

REGINALD ARTHUR WILLIAM SPOONER.